United States Patent [19]

Gerstmann et al.

[11] Patent Number: 5,772,113
[45] Date of Patent: Jun. 30, 1998

[54] TWO-PIPE HEAT PUMP SYSTEM WITH ISOLATED TANK COIL FOR DOMESTIC HOT WATER

[75] Inventors: Joseph Gerstmann, Framingham, Mass.; Paul F. Swenson, Cleveland, Ohio

[73] Assignee: Advanced Mechanical Technology, Inc., Watertown, Mass.

[21] Appl. No.: 717,287

[22] Filed: Sep. 20, 1996

Related U.S. Application Data

[63] Continuation-in-part of Ser. No. 336,985, Nov. 10, 1994, Pat. No. 5,558,273.

[51] Int. Cl.[6] .................................................. F24D 3/00
[52] U.S. Cl. .......................... 237/8 R; 237/2 B; 62/323.1
[58] Field of Search ........................... 237/2 B; 62/323.1, 62/323.4

[56] References Cited

U.S. PATENT DOCUMENTS

| | | | |
|---|---|---|---|
| 1,969,187 | 8/1934 | Schutt | 257/8 |
| 2,721,061 | 10/1955 | Freer | 237/8 R |
| 4,055,964 | 11/1977 | Swenson et al. | 62/238 |
| 4,178,772 | 12/1979 | Swenson et al. | 62/238 |
| 4,312,188 | 1/1982 | Swenson et al. | 62/160 |
| 4,350,024 | 9/1982 | Möll | 62/239 |
| 4,373,346 | 2/1983 | Hebert et al. | 62/79 |
| 4,976,464 | 12/1990 | Swenson | 237/81 |
| 5,009,085 | 4/1991 | Ramshaw et al. | 62/476 |
| 5,046,478 | 9/1991 | Clawson | 126/110 R |
| 5,050,394 | 9/1991 | Dudley et al. | 62/115 |
| 5,095,715 | 3/1992 | Dudley | 62/228.4 |
| 5,099,651 | 3/1992 | Fischer | 62/79 |
| 5,192,022 | 3/1993 | Swenson | 237/2 B |
| 5,193,138 | 3/1993 | Richey et al. | 392/341 |
| 5,226,594 | 7/1993 | Swenson | 237/2 B |
| 5,253,805 | 10/1993 | Swenson | 237/2 B |
| 5,320,166 | 6/1994 | Swenson | 165/18 |
| 5,363,673 | 11/1994 | Atterbury et al. | 62/323 |
| 5,366,153 | 11/1994 | Swenson | 237/19 |
| 5,429,179 | 7/1995 | Klausing | 165/29 |
| 5,485,879 | 1/1996 | Lannes | 165/70 |
| 5,544,645 | 8/1996 | Armijo et al. | 126/101 |
| 5,558,273 | 9/1996 | Swenson et al. | 237/2 B |

OTHER PUBLICATIONS

"Introducing the Combicor™ Direct Fired System," Bradford White Corporation, Spring House Corporate Center, Suite 250, 321 Norristown Road, Ambler, PA 19002–2755 (Advertisement Brochure).

Primary Examiner—Henry A. Bennett
Assistant Examiner—Derek S. Boles
Attorney, Agent, or Firm—Hamilton, Brook, Smith & Reynolds, P.C.

[57] ABSTRACT

An engine-driven heat pump system is disclosed in which the waste heat from the engine is used to only heat the water contained in a water heater. Space heating may be then provided by circulating the water through an air-handling unit. In order to simplify the operation, the engine's coolant is circulated through a tube surrounding the heater's storage tank. Any risk of contamination to the potable water supply is removed by venting the region surrounding the coolant-to-water heat exchanger. This is achieved by assuring that a surrounding insulation layer does not form a seal over the heat exchanger and by using a non-setting thermally conductive paste between the tube and tank.

23 Claims, 4 Drawing Sheets

5,772,113

TWO-PIPE HEAT PUMP SYSTEM WITH ISOLATED TANK COIL FOR DOMESTIC HOT WATER

RELATED APPLICATIONS

This application is a Continuation-in-Part of previously filed U.S. patent application Ser. No. 08/336,985, entitled "Two-Pipe System for Refrigerant Isolation", filed on Nov. 10, 1994 now U.S. Pat. No. 5,558,273 by Paul F. Swenson, et al., teachings of which are incorporated herein in their entirety by this reference.

BACKGROUND OF THE INVENTION

Various designs have been proposed for engine-driven air conditioning systems. Generally, in these systems, an internal combustion engine drives a compressor that uses a refrigerant to either heat or cool a space such as a dwelling. While the use of the internal combustion engines limits the overall efficiency of the systems, the efficiency may be increased by capturing the waste heat from the engine. During the colder months, the waste heat from the engine can be used to heat the air in the dwelling. At all times of the year, the waste heat from the engine can be used to provide supplemental heating to a hot water heater.

These air conditioning systems, in order to provide the capability to heat the water of the hot water heater and/or the air within the dwelling, incorporate a series of valves that selectively conduct fluid, which has been heated by the engine, to either the hot water heater or an air handler. Since the engine coolant is typically toxic, intermediate fluid circuits or double-wall heat exchangers are commonly used to transport the engine's heat to the water heater.

SUMMARY OF THE INVENTION

The principal problem with these known engine-driven air conditioning/water heating systems is the fact that they tend to be complex. The valve systems that selectively route the engine-heated fluid to the air handler and/or the water heater can be expensive and require complex control circuitry. Moreover, the intermediate fluid circuits add their own complexity and require separate, dedicated pumps.

The present invention avoids the problems associated with these systems by using the engine coolant to directly heat the water in the water heater. This generally avoids the necessity for complex valve arrangements. In fact, in the preferred embodiment, the engine coolant may only directly heat the water contained in the water heater's storage tank, as long as there is a requirement for some form of heating or cooling within the dwelling. Air heating in the dwelling may then be provided in some embodiments by circulating water from the storage tank through an air handling unit. When the dwelling/water heater does not require additional heat, the coolant may be dissipated through an outdoor radiator.

The use of the engine coolant to directly heat the water in the storage tank could in conventional designs create some danger of contamination to the dwelling's potable water. In the present invention, this threat is avoided by creating a permeable interface between a coolant-to-water heat exchanger that is used to carry the engine coolant and the storage tank of the hot water heater. In effect, a double-wall, vented heat exchanger results. A number of techniques achieve this desired interface. First, a non-setting thermally conductive paste is used between the coolant tubing and the storage tank's wall. Further, insulation that shrouds the heat exchanger and storage tank leaves them open to the atmosphere. In specific embodiments, this is achieved in the context of an otherwise impermeable insulation layer by placing a film between the insulation and the heat exchanger tank. To improve the thermal contact, the heat exchanger is preferably formed from flattened tubing.

In general, according to one aspect, the invention features a heat pump system in which a compressor supplies a refrigerant for air conditioning. The compressor is driven by an internal combustion engine, which as a consequence of its operation produces waste heat. This heat is provided to a water heater via a coolant-to-water heat exchanger through which the engine's coolant is circulated.

In specific embodiments, an engine coolant circulating pump is used to circulate the engine coolant from the engine only to the coolant-to-water heat exchanger. The engine's heat is not directly transferred to other potential heat sinks such as a dwelling air handler. Instead, a water-to-air coil is provided, through which water from the water heater is circulated to transfer its heat to the air. Accordingly, a control system activates a water circulating pump when the temperature of the water in the water heater rises above a high temperature set point and deactivates the water circulating pump when the temperature of the water in the water heater falls below a middle temperature set point. A heating element of the water heater is activated in response to the temperature of the water in the water heater falling below a low temperature set point.

In general, according to another aspect, the invention also features a water heater system. It comprises a water storage tank and heating element, such as a burner, for heating the water storage tank. A liquid-to-water heat exchanger surrounds tank and is in a thermally conductive arrangement with it.

In specific embodiments, a vented insulation layer surrounds the water storage tank and the liquid-to-water heat exchanger. Also, a thermally conductive paste is preferably used between an inner surface of the liquid-to-water coil and an outer surface of the water storage tank to increase thermal conductivity. The paste should be a non-setting type so that fluid leaking from the coil will not enter the water supply. To provide a visual indication that a leak has a occurred, a film layer is used to separate the insulation from the water storage tank and the liquid-to-water heat exchanger so that the leakage fluid may drain to the surrounding environment.

In general, according to still another aspect, the invention also features a method for manufacturing a water heater. This method comprises attaching, preferably by tack-welding, an end of a liquid-to-water tube to a water storage tank of the water heater. The tube is then wound around the storage tank, preferably under tension and by rotating the tank on its longitudinal axis. The other end of the tube is then attached or tacked to the water storage tank. Finally, the water storage tank and the liquid-to-water tube are shrouded in a vented insulation layer.

In preferred embodiments, the method also includes flattening the liquid-to-water coil into an obrotund or obround shape prior to winding.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
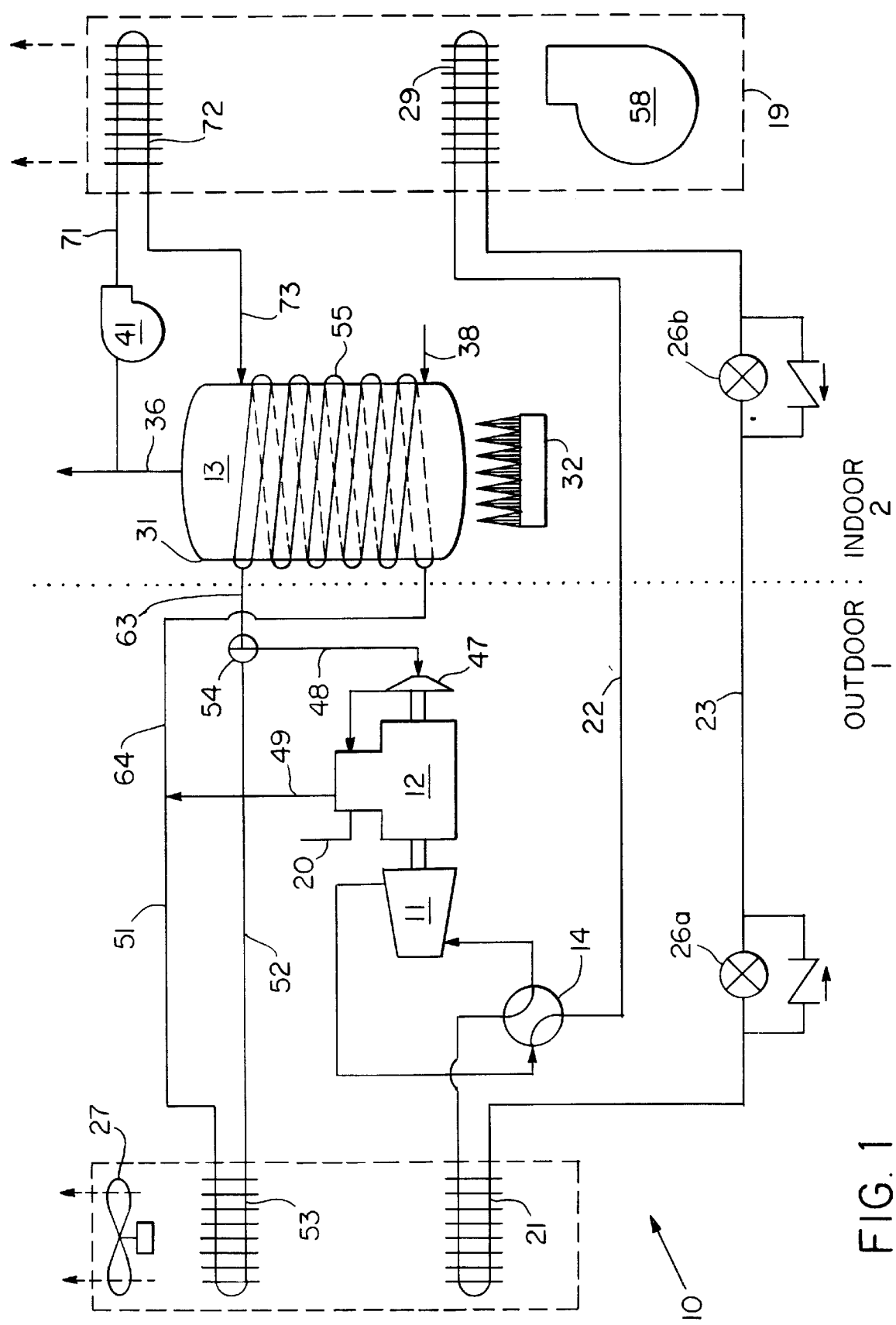
FIG. 1 is a schematic diagram of a heat pump system according to the present invention.

FIG. 1 shows a four-pipe engine-driven heat pump system 10 that has been constructed according to the principles of the present invention. Generally, two pipes 63,64 convey engine coolant between an outdoor environment 1 and a region 2 for which air conditioning, i.e. heating or cooling, is required such as any residential, work, or other indoor space. Another two pipes 22,23 convey a refrigerant fluid between the indoor 2 and outdoor 1 spaces.

The system 10 includes a heat pump compressor 11, which is driven by a fuel-fired prime mover 12. The prime mover 12 is an internal combustion engine or other heat engine. When configured to supply heat in a space heating mode, the refrigerant fluid is compressed by the engine-driven compressor 11 in the outdoor part of the system 10. The compressed refrigerant is then conveyed to the indoor space-conditioning air handler 19 through a reversing, or four-way cross-over, valve 14. The refrigerant is cooled in air-cooled condenser 29 in air handler 19 and returns to the outdoor unit where it is expanded through a first expansion valve 26a and evaporated in a refrigerant-to-air coil 21. The refrigerant then returns to the compressor 11 via the reversing valve 14. To convert this two-pipe circuit into a space cooling mode, the reversing valve 14 is rotated 90°, and second expansion valve 26b becomes relevant.

As a consequence of driving the compressor 11, the engine 12 produces excess heat. In the preferred embodiment, this heat is used solely to heat the water contained in a potable hot water heater 13. This distinguishes it from many systems that use the heat from the engine 12 to either heat the air in the indoor space and/or allow the heat from the engine 12 to be used to heat the water in the hot water heater. While adding options for directly distributing the heat from the engine 12, these systems require additional valves and piping to achieve the added functionality which increase cost and complexity. Moreover, since the heat is being distributed to potable water heaters, intermediate fluids or double-wall heat exchangers that carry the heat into the water heater are required to avoid the risk of contamination.

In the present invention, a pump 47 is driven by the engine 12 to circulate the engine coolant. The coolant is conveyed through the engine's cooling jacket and exhaust where it absorbs heat rejected by the engine 12, then through lines 49 and 64 into the indoor space. The cooled engine exhaust is discharged through exhaust pipe 20. The coolant enters a coolant-to-water heat exchanger 55 that is wrapped around the water storage tank 31 of a water heater 13 and returns to the pump 47 via pipes 63 and 48. The coolant-to-water heat exchanger 55 is preferably in the form of a tube that is helically coiled around the outer surface of the storage tank 31.

In some situations, it may be desirable to not heat the water in the water heater 13. During the summer months, the heat requirements of the indoor space may be limited and the potable water in the water storage tank 31 may be at or above its set point. In these situations, the valve 54 is rotated 180° so that the coolant exiting from the engine 12 is conveyed through pipes 51 and 52 to a coolant-to-air coil 53 through which air is moved by a fan 27 to dissipate the engine's heat to the surrounding outdoor environment.

Heat stored in the water contained in the water storage tank 31 may be used to fulfill some of the heating requirements of the indoor space 2 during the cooler months. An electric pump 41 is provided to circulate the potable hot water from the water storage tank 31 to a water-to-air heating coil 72 located in the indoor air handler 19 via pipes 71 and 73. In this way, heat produced by the engine 12 may be used to heat the air within the indoor space 2, albeit indirectly. This configuration avoids the necessity of a complex valve arrangement between the outdoor space portion of the two-pipe circuit, the water heater 13, and indoor air handler 19. Further, the potable water is used as an intermediate fluid avoiding the need for a separate self-contained circuit to protect the indoor space 2 from engine coolant contamination. The water heater may also be used as a supplementary heat source to add to or substitute for the heat output of the heat pump.

Figure 2A:
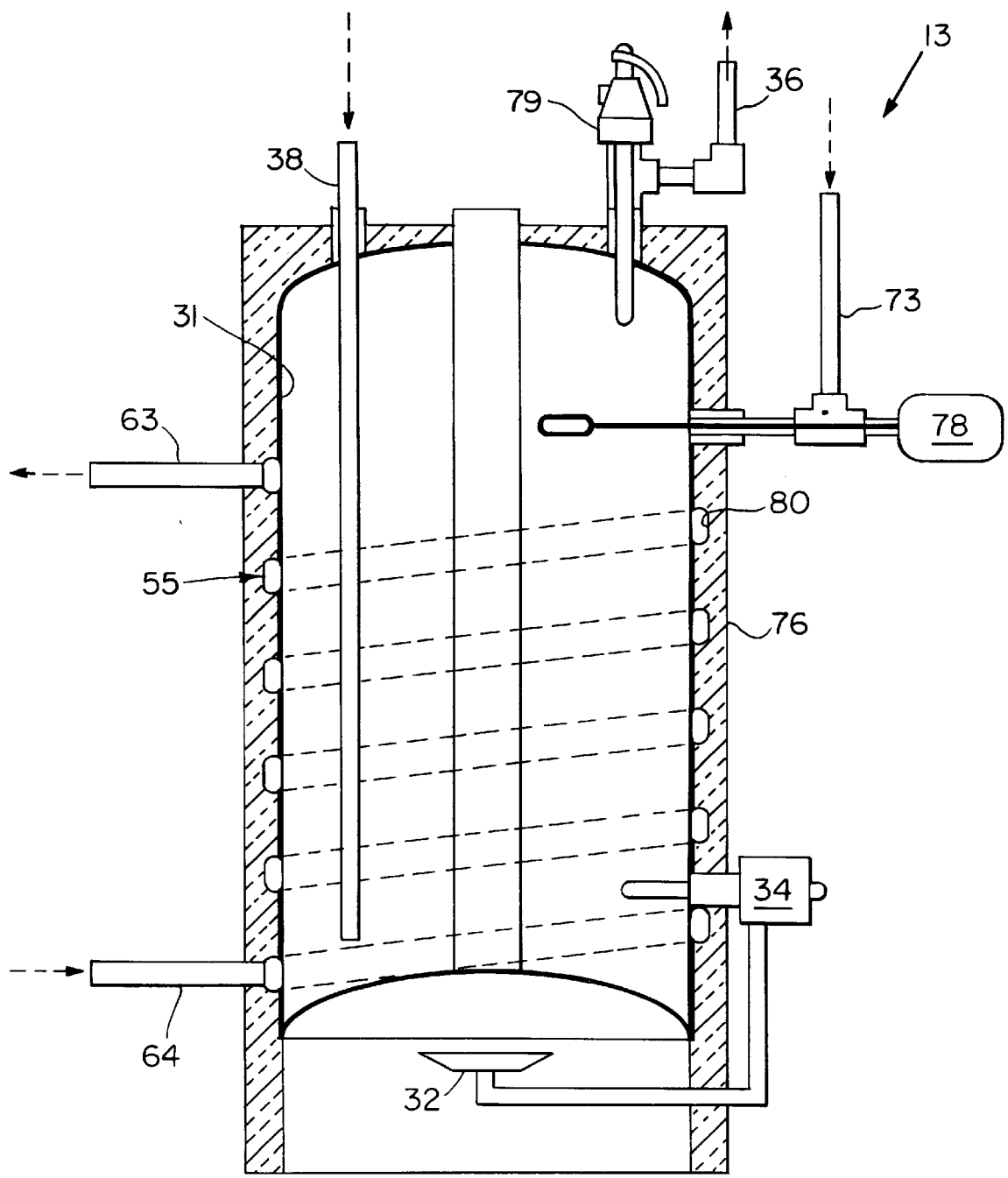
FIG. 2A is a vertical cross-sectional view of a domestic potable hot water heater of the present invention.

FIG. 2A is a cross-sectional view showing the water heater 13 and the coolant-to-water heat exchanger 55, which are also constructed according to the principles of the present invention.

The water heater is preferably gas-fired, although oil-fired as well as electric or other configurations are equally valid. A conventional thermostatic control valve 34 controls the supply of gas, oil or electricity to a burner, or other heating element 32 located underneath the water storage tank 31. A source of cold potable water provides new water into the tank 31 through pipe 38. Hot water leaves the tank through pipe 36 for domestic use. A conventional pressure and temperature relief valve 79 is provided on this pipe. The exit pipe 36 also supplies hot water to the water-to-air heating coil 72.

The coolant-to-water heat exchanger 55 surrounds the water storage tank 31. The hot coolant from the engine 12 first enters through pipe 64 located near the bottom of the tank 31 where the heating requirements are the highest due to the fact that new water is supplied to the bottom of the tank 31. The coolant then passes through coil 80 and exits through pipe 63 back to the engine 12. The coil 80 is wrapped a number of times around the tank in a helical fashion. Although six circuits are explicitly shown, it can be more or less than this number depending upon the cooling requirements of the engine 12 and heat that the hot water heater can accept. Multiple parallel coils, double helixes, for example, may also be used. The water heater is also shrouded in an insulating layer 76.

The electric pump 41 is controlled by a thermostat controller 78, which senses stored water temperature near the top of the water heater storage tank 31. The thermostat-controller 78 is set to cycle the water pump 41 at a temperature that is above the cut-off temperature of the gas-burner thermostat 34. Preferably, the heating element 32 will be set to a cut-off of 120° F. In this case, the pump 41 will be set to cut-in at 140° F. and cut-off at 130° F. Thus, under normal heating operation, the potable hot water will be heated by the engine coolant up to a temperature of 140° F. at which point the pump 41 will be activated. The hot water is then pumped through the water-to-air coil 72 to heat the indoor space until the water cools to about 130° F., at which time the thermostat-controller 78 will shut the pump 41 off. Thus, the water will be heated by the engine 12 in the range above the cut-off temperature of the burner (120° F.), up to 140°. If the heat from the engine 12 is unable to satisfy the hot water demand, the heating element 32 will be switched on to maintain a water temperature of 120° F.

Space heating may also be provided when the heat pump is inoperable for any reason, or to provide supplemental heating. In this case, a controller 78 switches on the water pump 41 and the air handler blower 58. When the water temperature in the water storage tank 31 drops to the cut-in temperature of the thermostat 34, the heating element will switch on to provide heat for space heating and/or domestic water heating.

More generally, the control method and fluid circuit facilitates "add-on" applications of the water heater, since the heating of potable water by the heat pump and the supplemental space heating by the water heater are controlled independently of the control system of the heat pump, and do not require modification of the heat pump or its controls.

Figure 2B:
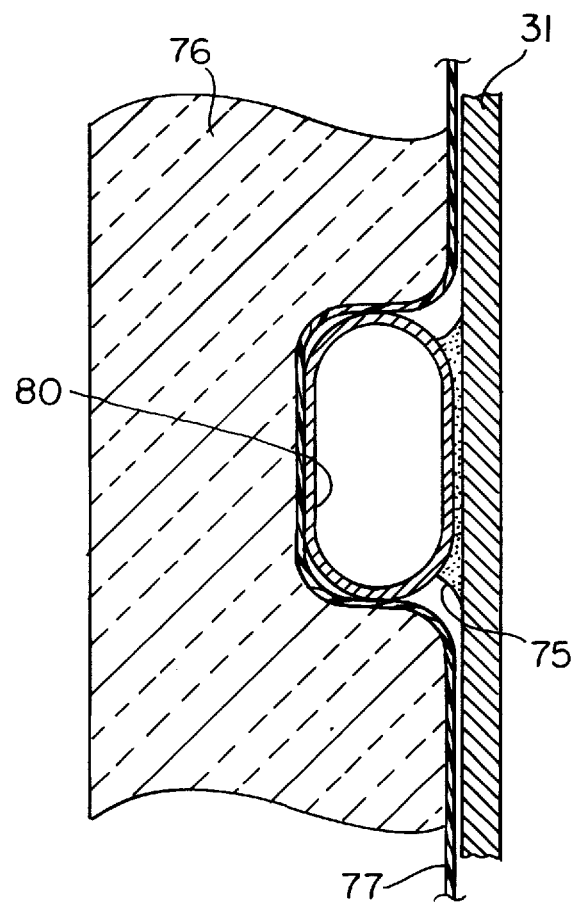
FIG. 2B is a more detailed cross-sectional view of coolant-to-water coil and the interface with the water storage tank.

FIG. 2B shows the coolant-to-water coil 80, insulation 76, and water storage tank sidewall 31. To prevent contamination of the potable water stored in the tank 31 by the typically toxic coolant, the coolant coil 80 is external to the water storage tank 31 and the interface between coil 80 and tank 31 is vented to the atmosphere. A thermally conductive paste 75 is of a non-setting type such that in the event of a leak, either in the storage tank wall or the coil 80, the leaking fluid can readily escape through the paste to the surrounding environment, making it visible and unlikely that the coolant leaking from the coil 80 would cause a further leak into the tank 31 containing the potable water supply. The thermally conductive paste 75 is preferably an aluminum or zinc-oxide powder in a grease base, which is applied between the coil 80 and the outer tank wall. Furthermore, if a non-permeable-type insulation is used, such as a closed-cell urethane foam, the insulation 76 covering the tank 31 and coil 80 is separated from the tank and coil by a thin plastic film 77, such as polyethylene film. This ensures that the tank 31 and coil 55 are not sealed from the atmosphere by the insulation 76. In effect, this configuration provides an inexpensive method of forming a double-wall, vented heat exchanger, requiring only a moderate amount of low-cost steel tubing and a small amount of thermally conductive paste.

Figure 3:
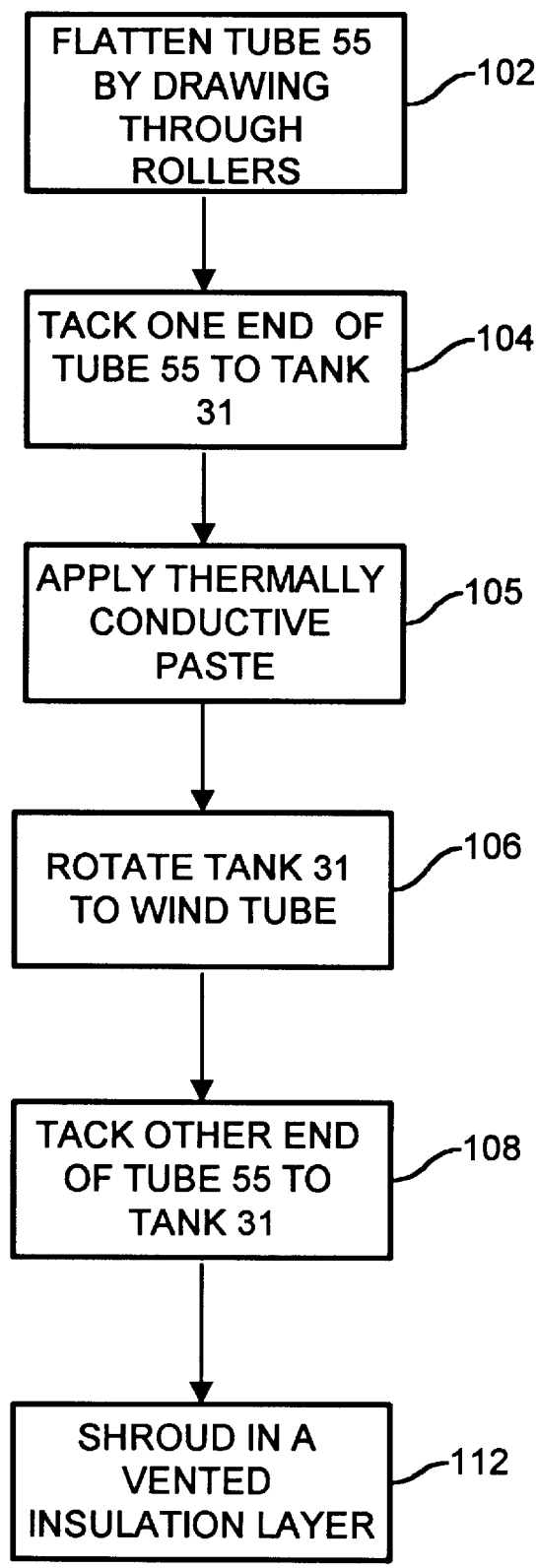
FIG. 3 is a process diagram illustrating a method for manufacturing the hot water heater of the present invention.

FIG. 3 shows a method for manufacturing the water storage tank 31 with the coolant-to-water heat exchanger 55. The exchanger preferably comprises a steel or other low-cost material tube that is approximately one-half inch in diameter with a 0.035 inch thick wall. The tube is first formed into an obrotund or obround shape with flat sides, from its original round cross-section, by drawing it through rollers in step 102. The tube is clamped or tack-welded at one end (step 104) to the tank 31. Next, in step 105, the thermally conductive paste is applied to the location of the mechanical interface between the coil 80 and the outer wall of the tank 31, preferably on the side of the tube that will abut the tank 31. The tube is then tension wound around the tank 31 by turning the tank on its longitudinal axis (step 106). During this winding process, the tube is maintained under tension. This tension is preferably between 100 and 200 pounds of force. After the coiling is complete, the opposite end of the tube is clamped or tack-welded to the outer surface of the tank 31 to maintain tension on the resultant coil 80 in step 108.

The flattening of the tube increases its area-contact against the tank over a circular tube which would simply provide a line-contact. For one-half inch to ⅝ inches outside diameter tubing, the minor diameter of the flattened, obrotund tube 55 is preferably about ⅜ to 7/16 inches. This minimizes increases in the liquid pressure drop due to the reduction in the cross-sectional area while increasing the area contact to provide good thermal conductivity.

Finally, in step 112, the tank 31 and heat exchanger 55 are shrouded in the vented insulation layer 76.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A heat pump system comprising:
    a compressor which supplies a refrigerant for air conditioning;
    an internal combustion engine which drives the compressor and passes its waste heat to an engine coolant;
    a water heater which supplies hot water;
    a coolant-to-water heat exchanger through which the engine coolant is circulated to transfer its heat to water in the water heater; and
    a water-to-air coil through which water from the water heater is circulated to transfer its heat to air.

2. A heat pump system comprising:
    a compressor which supplies a refrigerant for air conditioning;
    an internal combustion engine which drives the compressor and passes its waste heat to an engine coolant;
    a water heater which supplies hot water;
    a coolant-to-water heat exchanger through which the engine coolant is circulated to transfer its heat to water in the water heater; and
    an engine coolant circulating pump which circulates the engine coolant from the engine only to the coolant-to-water heat exchanger within a space where heating is desired.

3. A heat pump system comprising:
    a compressor which supplies a refrigerant for air conditioning;
    an internal combustion engine which drives the compressor and passes its waste heat to an engine coolant;
    a water heater which supplies hot water;
    a coolant-to-water heat exchanger through which the engine coolant is circulated to transfer its heat to water in the water heater;
    a water-to-air coil through which water from the water heater is circulated to transfer its heat to air; and
    a water circulating pump which circulates the water from the water heater through the water-to-air coil.

4. The heat pump system described in claim 3, further comprising a control system which 1) activates a heating element of the water heater in response to the temperature of the water in the water heater falling below a low temperature set point, 2) activates the water circulating pump when the temperature of the water in the water heater rises above a high temperature set point, and 3) deactivates the water circulating pump when the temperature of the water in the water heater falls below a middle temperature set point, being between the low and high temperature set points.

5. A heat pump system comprising:
a compressor which supplies a refrigerant for air conditioning;
an internal combustion engine which drives the compressor and passes its waste heat to an engine coolant;
a water heater which supplies hot water;
a coolant-to-water heat exchanger through which the engine coolant is circulated to transfer its heat to water in the water heater; and
a coolant-to-air coil through which the coolant is circulated when the water stored in the water heater does not require further heating.

6. A space heating method comprising:
driving a compressor, which supplies a refrigerant for air conditioning, with an internal combustion engine;
capturing waste heat from the engine in an engine coolant;
circulating the engine-heated coolant through a coolant-to-water heat exchanger that is in a thermally conductive association with a water heater; and
circulating water from the water heater through a water-to-air heat exchanger to provide heat to a space.

7. A space heating method comprising:
driving a compressor, which supplies a refrigerant for air conditioning, with an internal combustion engine;
capturing waste heat from the engine in an engine coolant; and
circulating the engine-heated coolant from the engine only through a coolant-to-water heat exchanger that is in a thermally conductive association with a water heater.

8. A space heating method comprising:
driving a compressor, which supplies a refrigerant for air conditioning, with an internal combustion engine;
capturing waste heat from the engine in an engine coolant;
circulating the engine-heated coolant through a coolant-to-water heat exchanger that is in a thermally conductive association with a water heater; and
circulating water from the water heater through a water-to-air coil through which air is circulated to heat the air in response to a temperature of the water in the water heater exceeding a high temperature set point.

9. The space heating method described in claim 8, further comprising activating a heating element of the water heater in response to the temperature of the water in the water heater falling below a low temperature set point.

10. The space heating method described in claim 9, further comprising deactivating circulation of the water through the water-to-air coil in response to the temperature of the water in the water heater falling below a middle temperature set point being between the low and high temperature set points.

11. A space heating method comprising:
driving a compressor, which supplies a refrigerant for air conditioning, with an internal combustion engine;
capturing waste heat from the engine in an engine coolant;
circulating the engine-heated coolant through a coolant-to-water heat exchanger that is in a thermally conductive association with a water heater; and
circulating water from the water heater through a water-to-air coil to heat air to supplement or replace air heating by the compressor in response to inadequate heating capacity or malfunction of the compressor.

12. A water heater system, comprising:
a water storage tank which is adapted to contain water;
a heating element for heating the water storage tank;
a liquid-to-water heat exchanger surrounding and in a thermally conductive arrangement with the water storage tank; and
a vented insulation layer surrounding the water storage tank and the liquid-to-water heat exchanger.

13. A water heater system comprising:
a water storage tank which is adapted to contain water;
a heating element for heating the water storage tank;
a liquid-to-water heat exchanger surrounding and in a thermally conductive arrangement with the water storage tank;
a vented insulation layer surrounding the water storage tank and the liquid-to-water heat exchanger; and
a film layer that separates the insulation from the water storage tank and the liquid-to-water heat exchanger so that the water storage tank and the liquid-to-water heat exchanger are exposed to a surrounding environment.

14. A water heater system comprising:
a water storage tank which is adapted to contain water;
a heating element for heating the water storage tank;
a liquid-to-water heat exchanger surrounding and in a thermally conductive arrangement with the water storage tank; and
a thermally conductive paste located between an inner surface of the liquid-to-water heat exchanger and an outer surface of the water storage tank.

15. The water heater system of claim 14, wherein the paste is a non-setting type.

16. The water heater system of claim 12, wherein the liquid-to-water heat exchanger comprises a coil that is wrapped around the water storage tank.

17. A water heater system comprising:
a water storage tank which is adapted to contain water;
a heating element for heating the water storage tank;
a liquid-to-water heat exchanger surrounding and in a thermally conductive arrangement with the water storage tank, the heat exchanger comprising a coil that is wrapped around the water storage tank and has an obrotund cross-section to increase thermal conduction with the water storage tank.

18. A water heater system comprising:
a water storage tank which is adapted to contain water;
a heating element for heating the water storage tank;
a liquid-to-water heat exchanger surrounding and in a thermally conductive arrangement with the water storage tank; and
an engine coolant pump which circulates heated coolant from an internal combustion engine through the liquid-to-water heat exchanger.

19. A method for manufacturing a water heater comprising:
attaching an end of a liquid-to-water tube to a water storage tank of the water heater;
winding the tube around the storage tank;
attaching another end of the tube to the water storage tank; and shrouding the water storage tank and the liquid-to-water tube in a vented insulation layer.

20. A method for manufacturing a water heater comprising:

attaching an end of a liquid-to-water tube to a water storage tank of the water heater;

winding the tube around the storage tank;

attaching another end of the tube to the water storage tank;

shrouding the water storage tank and the liquid-to-water tube in a vented insulation layer; and applying a thermally conductive paste between the liquid-to-water tube and the water storage tank.

21. A method for manufacturing a water heater comprising:

flattening a liquid-to-water tube;

attaching an end of the liquid-to-water tube to a water storage tank of the water heater;

winding the tube around the storage tank;

attaching another end of the tube to the water storage tank; and shrouding the water storage tank and the liquid-to-water tube in a vented insulation layer.

22. A method for manufacturing a water heater comprising:

attaching an end of a liquid-to-water tube to a water storage tank of the water heater;

winding the tube around the storage tank;

attaching another end of the tube to the water storage tank;

shrouding the water storage tank and the liquid-to-water tube in a vented insulation layer; and separating the insulation layer from the liquid-to-water tube and the water storage tank with a film layer.

23. A method for manufacturing a water heater comprising:

attaching an end of a liquid-to-water tube to a water storage tank of the water heater;

winding the tube around the storage tank under tension;

attaching another end of the tube to the water storage tank; and shrouding the water storage tank and the liquid-to-water tube in a vented insulation layer.

* * * * *